United States Patent
Wasko et al.

(10) Patent No.: US 12,536,035 B2
(45) Date of Patent: Jan. 27, 2026

(54) WORK SCHEDULING BASED ON A READ TIME VALUE

(71) Applicant: MELLANOX TECHNOLOGIES, LTD., Yokneam (IL)

(72) Inventors: Wojciech Wasko, Młynek (PL); Dotan David Levi, Kiryat Motzkin (IL); Harsha Deepak Banuli Nanje Gowda, Campbell, CA (US); Natan Manevich, Ramat HaSharon (IL); Daniel Marcovitch, Yokneam Illit (IL)

(73) Assignee: Mellanox Technologies, Ltd, Yokneam (IL)

( * ) Notice: Subject to any disclaimer, the term of this patent is extended or adjusted under 35 U.S.C. 154(b) by 463 days.

(21) Appl. No.: 17/988,812

(22) Filed: Nov. 17, 2022

(65) Prior Publication Data
US 2024/0168797 A1 May 23, 2024

(51) Int. Cl.
  *G06F 9/48* (2006.01)
  *G06F 1/12* (2006.01)
  *G06F 13/40* (2006.01)

(52) U.S. Cl.
  CPC .............. *G06F 9/4881* (2013.01); *G06F 1/12* (2013.01); *G06F 13/405* (2013.01)

(58) Field of Classification Search
  CPC ........ G06F 9/4881; G06F 1/12; G06F 13/405; G06F 9/4887; G06F 2209/509; G06F 9/52
  See application file for complete search history.

(56) References Cited

U.S. PATENT DOCUMENTS

| | | | |
|---|---|---|---|
| 6,604,178 B1 * | 8/2003 | Hall | G06F 3/0601 710/39 |
| 7,577,773 B1 * | 8/2009 | Gandhi | H04L 49/90 710/22 |
| 10,109,030 B1 * | 10/2018 | Sun | G06T 1/20 |
| 10,275,851 B1 * | 4/2019 | Zhao | G09G 5/363 |
| 10,645,164 B1 * | 5/2020 | Malwankar | G06F 3/0653 |
| 10,691,619 B1 * | 6/2020 | Gibson | G06F 3/067 |
| 12,141,093 B1 | 11/2024 | Zur et al. | |

(Continued)

OTHER PUBLICATIONS

IEEE Std. 1588-2008, "IEEE Standard for a Precision Clock Synchronization Protocol for Networked Measurement and Control Systems," The IEEE Instrumentation and Measurement Society, pp. 1-289, Jul. 24, 2008.

(Continued)

*Primary Examiner* — Adam Lee
(74) *Attorney, Agent, or Firm* — Meitar Patents Ltd.; Daniel Kligler

(57) ABSTRACT

In one embodiment, a system includes a peripheral data connection bus configured to connect to devices and transfer data between the devices, a scheduling machine configured to connect to the peripheral data connection bus and send a read request message to a first processing device, and the first processing device configured to be connected to the peripheral data connection bus, and responsively to the read request message add a time value to a read response message, and provide the read response message to the scheduling machine, and wherein the scheduling machine is configured to read the time value from the provided read response message and schedule processing of an operation by a second processing device responsively to the read time value.

26 Claims, 4 Drawing Sheets

(56) References Cited

U.S. PATENT DOCUMENTS

| | | | |
|---|---|---|---|
| 2005/0188105 A1* | 8/2005 | Reinhard | H04L 12/4633 709/238 |
| 2007/0044104 A1* | 2/2007 | Beatty, III | G06F 9/526 718/108 |
| 2012/0047513 A1* | 2/2012 | Lee | G06F 9/5038 718/104 |
| 2014/0013008 A1 | 1/2014 | Lazarus et al. | |
| 2018/0268512 A1* | 9/2018 | Pronovost | G06T 1/60 |
| 2020/0084150 A1* | 3/2020 | Burstein | H04L 47/805 |
| 2022/0060427 A1 | 2/2022 | Gallego | |
| 2022/0158772 A1* | 5/2022 | Burstein | H04L 1/1829 |
| 2023/0044281 A1 | 2/2023 | Shin et al. | |
| 2023/0130859 A1* | 4/2023 | Liu | G06F 12/0873 711/122 |
| 2023/0205580 A1 | 6/2023 | Wu et al. | |
| 2023/0341889 A1 | 10/2023 | Elliot | |
| 2024/0020233 A1* | 1/2024 | Glimcher | G06F 12/0822 |

OTHER PUBLICATIONS

Li et al., "Sundial: Fault-Tolerant Clock Synchronization for Datacenters", Proceedings of the 14th USENIX Symposium on Operating Systems Design and Implementation, pp. 1171-1186, Nov. 2020.
Levi et al., U.S. Appl. No. 17/983,427, filed Nov. 9, 2022.
Sur et al., U.S. Appl. No. 17/450,743, filed Oct. 13, 2021.
U.S. Appl. No. 17/983,427 Office Action dated Jun. 10, 2024.
Non Final US Office Action U.S. Appl. No. 17/983,427, dated Apr. 7, 2025.

* cited by examiner

WORK SCHEDULING BASED ON A READ TIME VALUE

The project leading to this application has received funding from the European Union's Horizon 2020 research and innovation program under grant agreement No 957403.

FIELD OF THE INVENTION

The present invention relates to computer systems, and in particular, but not exclusively to, work scheduling.

BACKGROUND

Accurately scheduling work in many devices may be limited for various reasons. For example, currently there are no semantics or primitives to schedule graphic processing unit (GPU) operations. Generally, as a kernel (unit of work on the GPU) becomes available, the GPU commences to execute the kernel. A naïve solution is for a central processing unit (CPU), which is feeding work to the GPU, to wait until just before the desired time that the kernel should be executed by the GPU, and then the CPU launches a task in the hope that the GPU performs the task immediately.

SUMMARY

There is provided in accordance with an embodiment of the present disclosure, a system including a peripheral data connection bus configured to connect to devices and transfer data between the devices, a scheduling machine configured to connect to the peripheral data connection bus and send a read request message to a first processing device, and the first processing device configured to be connected to the peripheral data connection bus, and responsively to the read request message add a time value to a read response message, and provide the read response message to the scheduling machine, and wherein the scheduling machine is configured to read the time value from the provided read response message and schedule processing of an operation by a second processing device responsively to the read time value.

Further in accordance with an embodiment of the present disclosure the first processing device is a network interface controller.

Still further in accordance with an embodiment of the present disclosure the scheduling machine is included in the network interface controller.

Additionally in accordance with an embodiment of the present disclosure the second processing device is a graphics processing unit.

Moreover, in accordance with an embodiment of the present disclosure the scheduling machine is included in the graphics processing unit.

Further in accordance with an embodiment of the present disclosure the first processing device includes a physical hardware clock to maintain a clock value, the first processing device is configured to retrieve the clock value from the physical hardware clock, and the first processing device is configured to add the time value based on the retrieved clock value to the read response message.

Still further in accordance with an embodiment of the present disclosure the first processing device is configured to synchronize the physical hardware clock to a remote clock value of a clock leader.

Additionally in accordance with an embodiment of the present disclosure the first processing device is configured to change a format of the retrieved clock value, and add the changed format dock value as the time value to the read response message.

Moreover, in accordance with an embodiment of the present disclosure the first processing device is configured to change the format of the retrieved clock value to little-endian order.

Further in accordance with an embodiment of the present disclosure the scheduling machine is configured to change a format of the read clock value, and schedule processing of the operations by the second processing device responsively to the changed format clock value.

Still further in accordance with an embodiment of the present disclosure the scheduling machine is configured to send the read request message with an address in an address range of an initialization segment of the first processing device, and responsively to the address being in the address range of the initialization segment, the first processing device is configured to retrieve the clock value from the physical hardware clock, and add the time value based on the retrieved clock value to the read response message, and provide the read response message to the scheduling machine.

Additionally in accordance with an embodiment of the present disclosure the first processing device includes a physical hardware clock to maintain a clock value, the first processing device is configured to retrieve the clock value from the physical hardware clock, and update a counter value responsively to the retrieved clock value, and add the time value based on the counter value to the read response message.

Moreover in accordance with an embodiment of the present disclosure, the system includes a host device to connect to the peripheral data connection bus, the host device including a central processing unit to execute a software application to enqueue a semaphore acquire to trigger the scheduling machine to intermittently send read request messages to the first processing device and compare time values received from the first processing device in respective read response messages to a given time value, and enqueue a work request to trigger the scheduling machine to schedule processing of the operation by the second processing device after the semaphore acquire completes processing.

There is also provided in accordance with another embodiment of the present disclosure, a scheduling machine device, including an interface to connect to a peripheral data connection bus, send a read request message to a first processing device, and receive a read response message including a time value from the first processing device, and a processor to read the time value from the received read response message, and schedule processing of an operation by a second processing device responsively to the read time value.

Further in accordance with an embodiment of the present disclosure the first processing device is a network interface controller.

Still further in accordance with an embodiment of the present disclosure the second processing device is a graphics processing unit.

Additionally in accordance with an embodiment of the present disclosure the processor is configured to change a format of the time value, and schedule processing of the operation by the second processing device responsively to the changed format time value.

Moreover, in accordance with an embodiment of the present disclosure the interface is configured to send the read request message with an address in an address range of an initialization segment of the first processing device.

Further in accordance with an embodiment of the present disclosure the processor is configured to intermittently send read request messages to the first processing device and compare time values received from the first processing device in respective read response messages to a given time value responsively to an enqueued semaphore acquire, and schedule processing of the operation by the second processing device after the semaphore acquire completes processing responsively to an enqueued work request.

There is also provided in accordance with still another embodiment of the present disclosure, a scheduling method, including connecting to a peripheral data connection bus, sending a read request message to a first processing device, receiving a read response message including a time value from the first processing device, reading the time value from the received read response message, and scheduling processing of an operation by a second processing device responsively to the read time value.

Still further in accordance with an embodiment of the present disclosure, the method includes maintaining a clock value, retrieving the clock value, and adding the time value based on the retrieved clock value to the read response message.

Additionally in accordance with an embodiment of the present disclosure, the method includes changing a format of the retrieved clock value, and wherein the adding includes adding the changed format clock value as the time value to the read response message.

Moreover, in accordance with an embodiment of the present disclosure the changing includes changing the format of the retrieved clock value to little-endian order.

Further in accordance with an embodiment of the present disclosure the sending includes sending the read request message with an address in an address range of an initialization segment of the first processing device, the method including responsively to the address being in the address range of the initialization segment the retrieving the clock value, the adding the time value based on the retrieved clock value to the read response message, and providing the read response message to the scheduling machine.

Still further in accordance with an embodiment of the present disclosure, the method includes maintaining a clock value, retrieving the clock value, updating a counter value responsively to the retrieved clock value, and adding the time value based on the counter value to the read response message.

Additionally in accordance with an embodiment of the present disclosure, the method includes enqueuing a semaphore acquire to trigger a scheduling machine to intermittently send read request messages to the first processing device and compare time values received from the first processing device in respective read response messages to a given time value, and enqueuing a work request to trigger the scheduling machine to schedule processing of the operation by the second processing device after the semaphore acquire completes processing.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
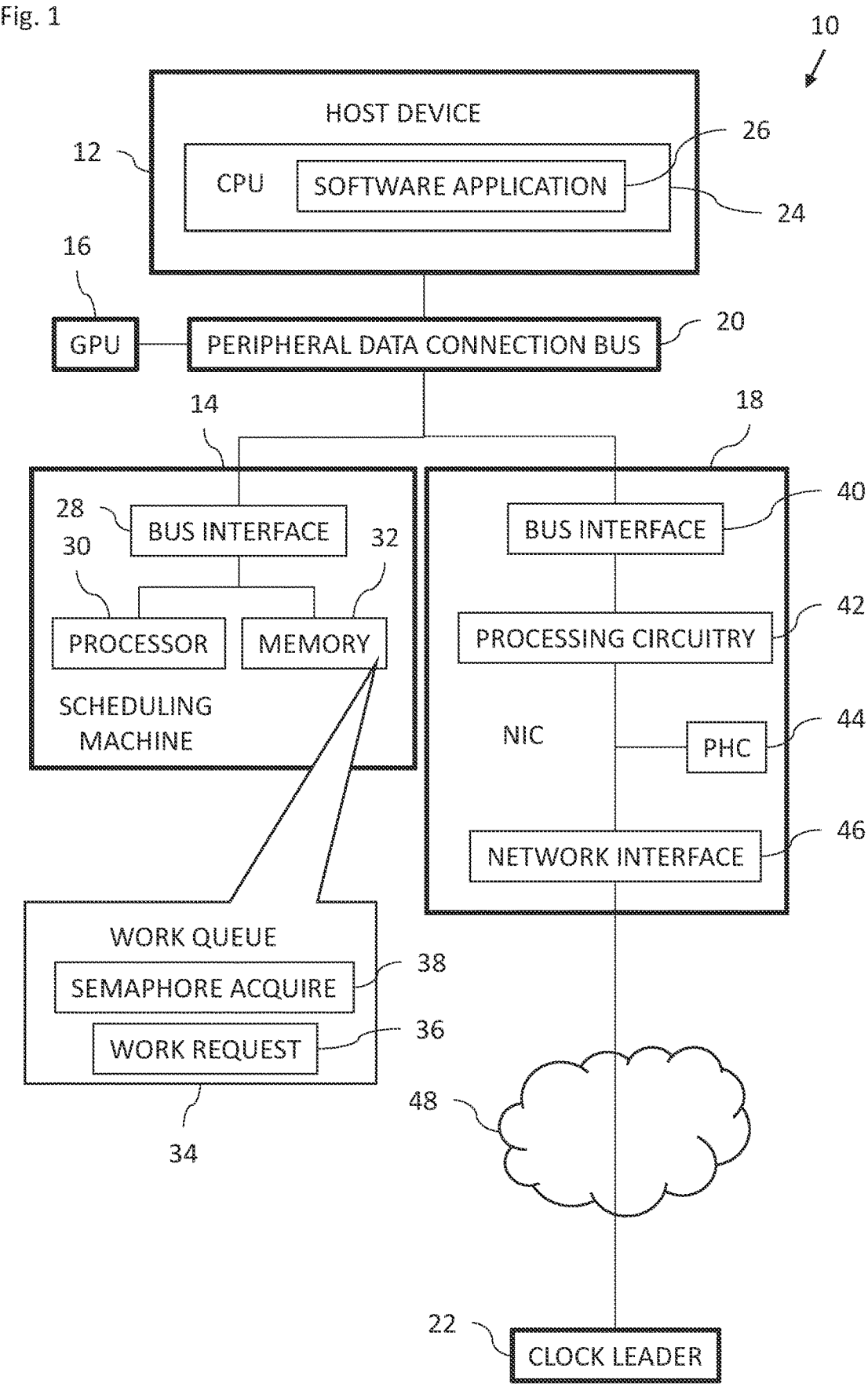
FIG. 1 is a block diagram view of a scheduling system constructed and operative in accordance with an embodiment of the present invention.

As previously mentioned, accurately scheduling work in many devices may be limited for various reasons. For example, currently there are no semantics or primitives to schedule graphic processing unit (GPU) operations. Generally, as a kernel (unit of work on the GPU) becomes available, the GPU commences to execute the kernel.

A naïve solution is for a central processing unit (CPU), which is feeding work to the GPU, to wait until just before the desired time that the kernel should be executed by the GPU, and then the CPU launches a task in the hope that the GPU performs the task immediately.

Another solution may include the GPU using a busy-wait loop waiting for the correct time to arrive before executing a waiting kernel. This solution however occupies the GPU resources during this waiting period thereby wasting GPU processing resources.

Embodiments of the present invention solve some drawbacks associated with work scheduling by providing a scheduling machine which based on a time value provided by a first processing device (e.g., network interface controller (NIC) or any suitable device such as an accelerator such as a CPU in a SmartNIC or a field-programmable gate array (FPGA)) schedules processing of one or more operations on a second processing device (e.g., GPU or any suitable processing device). The scheduling machine may be disposed in the first or second processing device or may be a standalone processing device.

In some embodiments, the scheduling machine sends a read request message to the first processing device via a peripheral data connection bus. The first processing device retrieves a clock value from a physical hardware clock and adds a time value based on the retrieved clock value to a read response message which is provided to the scheduling machine. The scheduling machine reads the time value from the read response message and if the read time value satisfies a condition with respect to a given time value (e.g., if the read time value is equal to or greater than the given time value), the scheduling machine schedules one or more operations on the second processing device. If the read time value does not satisfy the condition, then the scheduling machine sends another read request message to the first processing device, receives another read response message and so on until the time value read from the read response message satisfies the condition.

In some embodiments, the scheduling machine sends the read request message with an address in an address range of an initialization segment of the first processing device. Responsively to the read request message being in the address range of the initialization segment, the first processing device retrieves the clock value from the physical hardware clock, adds the time value based on the retrieved clock value to the read response message, and provides the read response message to the scheduling machine.

In some embodiments, the first processing device (e.g., the NIC) changes the format of the retrieved clock value to a format used by the scheduling machine. For example, a NIC natively operates in Big Endian whereas a GPU (which may comprise the scheduling machine) operates in little Endian. Therefore, in some embodiments, the first processing device converts the format of the retrieved clock value from Big Endian order to Little Endian order. In some cases, the conversion between Big Endian to Little Endian could be performed by the scheduling machine instead of by the first processing device.

In some embodiments, the first processing device may write a time value derived from the clock value (such as a counter which is derived from clock values (e.g., monotonically increasing counter)) to the read response message. Therefore, in some embodiments, the first processing device may retrieve the counter value and add the counter value as the time value to the read response message. The counter may be incremented at any suitable time interval, for example, every 500 microsecs. Some processing in 5G networks has to be performed periodically, e.g., every 500 microsecs (e.g., a 5G slot or 5G symbol counter).

In some embodiments, a CPU of a host device executes a software application to enqueue a semaphore acquire to trigger the scheduling machine to intermittently send read request messages to the first processing device and compare time values received from the first processing device in respective read response messages to a given time value, and enqueue a work request to trigger the scheduling machine to schedule processing of the operation by the second processing device after the semaphore acquire completes processing. The semaphore acquire is enqueued in a work queue prior to the work request so that the semaphore acquire needs to complete processing before the work request can be executed.

SYSTEM DESCRIPTION

Reference is now made to FIG. 1, which is a block diagram view of a scheduling system 10 constructed and operative in accordance with an embodiment of the present invention. The system 10 includes a host device 12, a scheduling machine 14, a graphics processing unit (GPU) 16, a network interface controller (MC) 18, a peripheral data connection bus 20, and a clock leader 22. In some embodiments, the graphics processing unit 16 and/or the network interface controller 18 may be replaced by any suitable processing device(s).

The host device 12 includes a central processing unit (CPU) 24, which is configured to execute a software application 26. In some embodiments, the host device 12 may be replaced by any suitable processing device. The software application 26 is described in more detail with reference to FIG. 2.

The peripheral data connection bus 20 is configured to connect to devices (e.g., the host device 12, the scheduling machine 14, the graphics processing unit 16, and the network interface controller 18) and transfer data between the devices 12, 14, 16, 18.

The scheduling machine 14 includes: a bus interface 28 to connect to a peripheral data connection bus 20; a processor 30; and a memory 32 used by the processor 30. In some embodiments, the memory 32 may be disposed in the scheduling machine 14, or in the host device 12, or in any suitable processing device. The memory 32 is configured to store a work queue 34 including one or more work requests 36 and optionally a semaphore acquire 38 to condition execution of the work request(s) 36 on completing execution of the semaphore acquire 38 as described in more detail with reference to FIG. 3. The functionality of the processor 30 is described in more detail with reference to FIG. 3. The scheduling machine 14 may be implemented as a stand-alone unit or may be disposed in the graphics processing unit 16 or the network interface controller 18 by way of example.

In practice, some or all of the functions of the processor 30 may be combined in a single physical component or, alternatively, implemented using multiple physical components. These physical components may comprise hard-wired or programmable devices, or a combination of the two. In some embodiments, at least some of the functions of the processor 30 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The network interface controller 18 includes a bus interface 40, processing circuitry 42, a physical hardware clock (PHC) 44, and a network interface 46. The bus interface 40 is configured to connect the network interface controller 18 to the peripheral data connection bus 20, The processing circuitry 12 may include packet processing circuitry to packets received over a network 18 and process packets for sending over the network via the network interface 46. The processing circuitry 42 may include a physical layer (PHY) unit and a MAC unit. The processing circuitry 42 may include an application specific integrated circuit (ASIC). The processing circuitry 42 is described in more detail with reference to FIG. 4. The physical hardware clock 44 is configured to maintain a clock value. The processing circuitry 42 is configured to synchronize the physical hardware clock 44 to a remote clock value of the clock leader 22, by way of example.

Regarding the graphics processing unit 16, graphics processing units (GPUs) are employed to generate three-dimensional (3D) graphics objects and two-dimensional (2D) graphics objects for a variety of applications, including feature films, computer games, virtual reality (VR) and augmented reality (AR) experiences, mechanical design, and/or the like. A modern GPU includes texture processing hardware to generate the surface appearance, referred to herein as the "surface texture," for 3D objects in a 3D graphics scene. The texture processing hardware applies the surface appearance to a 3D object by "wrapping" the appropriate surface texture around the 3D object. This process of generating and applying surface textures to 3D objects results in a highly realistic appearance for those 3D objects in the 3D graphics scene.

The texture processing hardware is configured to perform a variety of texture-related instructions, including texture operations and texture loads. The texture processing hardware generates accesses texture information by generating memory references, referred to herein as "queries," to a texture memory. The texture processing hardware retrieves surface texture information from the texture memory under varying circumstances, such as while rendering object surfaces in a 3D graphics scene for display on a display device, while rendering 2D graphics scene, or during compute operations.

Surface texture information includes texture elements (referred to herein as "texels") used to texture or shade object surfaces in a 3D graphics scene. The texture processing hardware and associated texture cache are optimized for efficient, high throughput read-only access to support the high demand for texture information during graphics rendering, with little or no support for write operations. Further, the texture processing hardware includes specialized functional units to perform various texture operations, such as level of detail (LOD) computation, texture sampling, and texture filtering.

In general, a texture operation involves querying multiple texels around a particular point of interest in 3D space, and then performing various filtering and interpolation operations to determine a final color at the point of interest. By contrast, a texture load typically queries a single texel, and returns that directly to the user application for further processing, Because filtering and interpolating operations typically involve querying four or more texels per processing thread, the texture processing hardware is conventionally built to accommodate generating multiple queries per thread. For example, the texture processing hardware could be built to accommodate up to four texture memory queries is performed in a single memory cycle. In that manner, the texture processing hardware is able to query and receive most or all of the needed texture information in one memory cycle.

Figure 2:
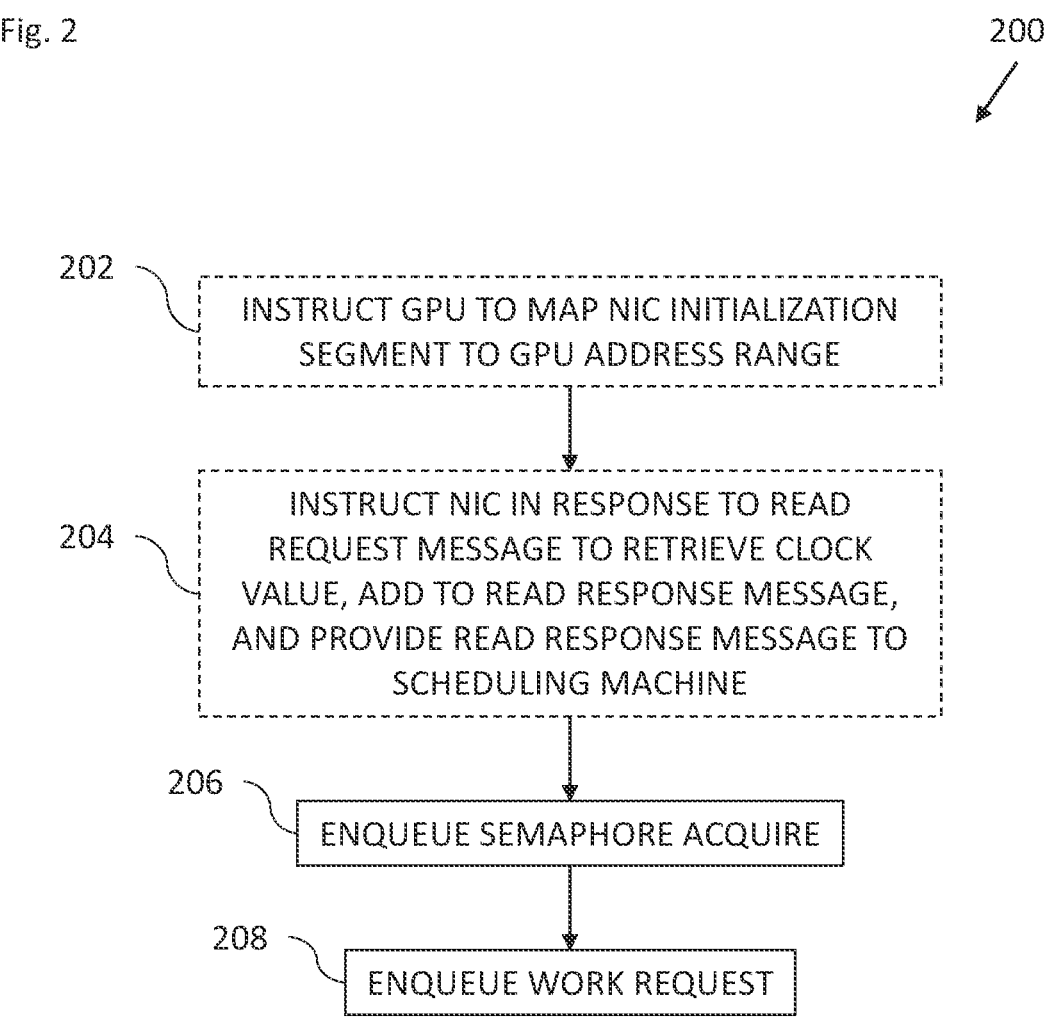
FIG. 2 is a flowchart including steps performed by a software application in the system of FIG. 1.

Reference is now made to FIG. 2, which is a flowchart 200 including steps performed by the software application 26 in the system 10 of FIG. 1. Reference is also made to FIG. 1. In some embodiments, the software application 26 is configured to instruct the graphics processing unit 16 to map an initialization segment of the network interface controller 18 to a GPU address range (block 202), In some embodiments, the software application 26 is configured to instruct the network interface controller 18, in response to receiving a read request message with an address in the address range of the initialization segment of the network interface controller 18, to retrieve a clock value or other time value, add the retrieved clock value or other time value to a read response message, and provide the read response message to the scheduling machine 14 (block 204). In some embodiments, the software application 26 is configured to enqueue the semaphore acquire 38 in the work queue 34 to trigger the scheduling machine 14 to intermittently send read request messages to the network interface controller 18 and compare time values received from the network interface controller 18 in respective read response messages to a given time value as described in more detail with reference to FIG. 3 (block 206). In some embodiments, the software application 26 is configured to enqueue the work request(s) 36 in the work queue 34 to trigger the scheduling machine 14 to schedule processing of one or more operations by the graphics processing unit 16 after the semaphore acquire 38 completes processing, as described in more detail with reference to FIG. 3 (block 208).

Figure 3:
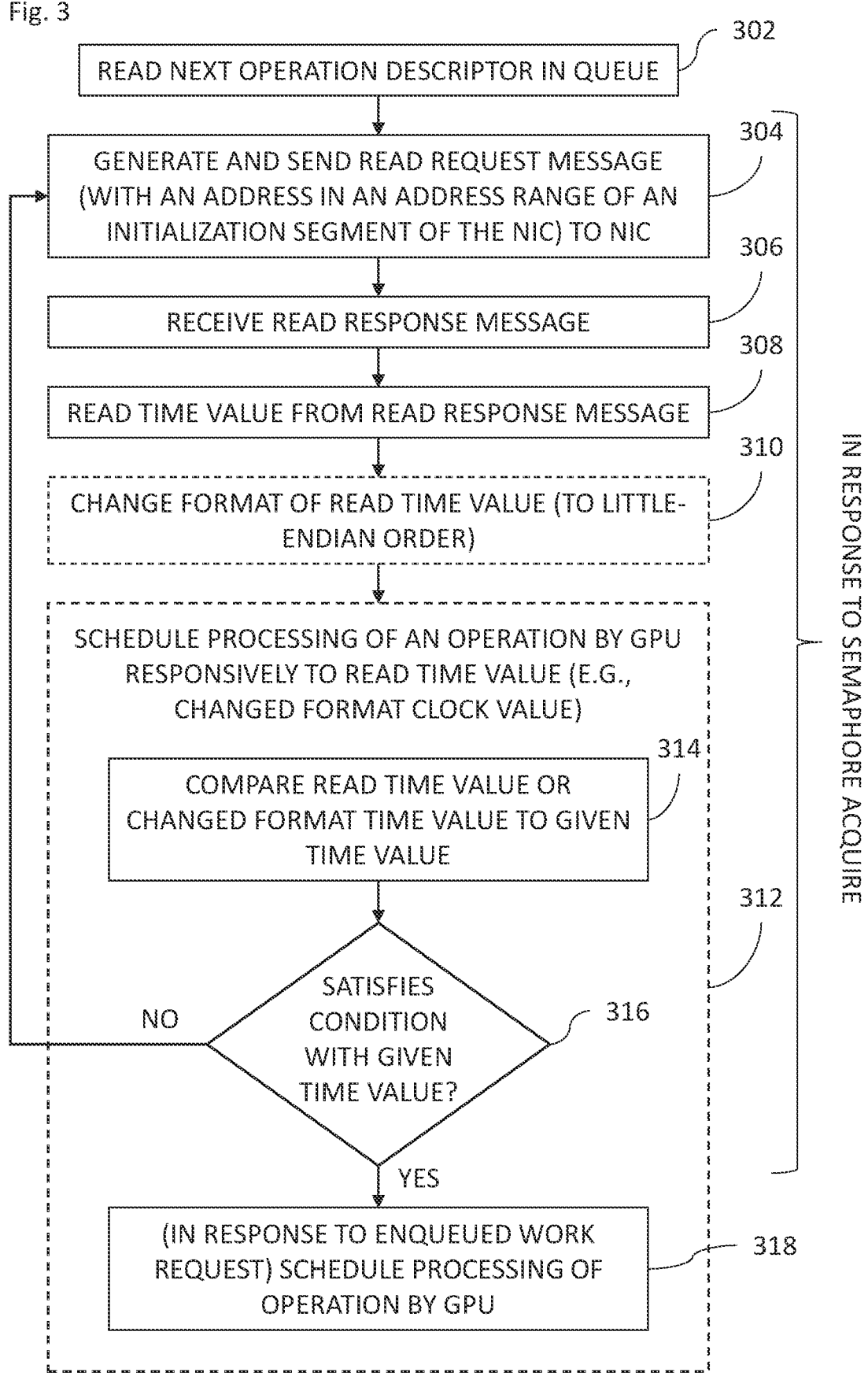
FIG. 3 is a flowchart including steps performed by a scheduling machine in the system of FIG. 1.

Reference is now made to FIG. 3, which is a flowchart 300 including steps performed by the scheduling machine 14 in the system 10 of FIG. 1, Reference is also made to FIG. 1. The processor 30 of scheduling machine 14 is configured to read the next operation descriptor in the work queue 34 (block 302), which is the semaphore acquire 38. The steps of blocks 304-316 described below with reference to FIG. 3 are performed as part of the semaphore acquire 38.

The processor 30 of the scheduling machine 14 is configured to generate a read request message. The bus interface 28 of the scheduling machine 14 is configured to send the read request message to the network interface controller 18 (block 304). In some embodiments the bus interface 28 is configured to send the read request message with a destination address in an address range of an initialization segment of the network interface controller 18.

Figure 4:
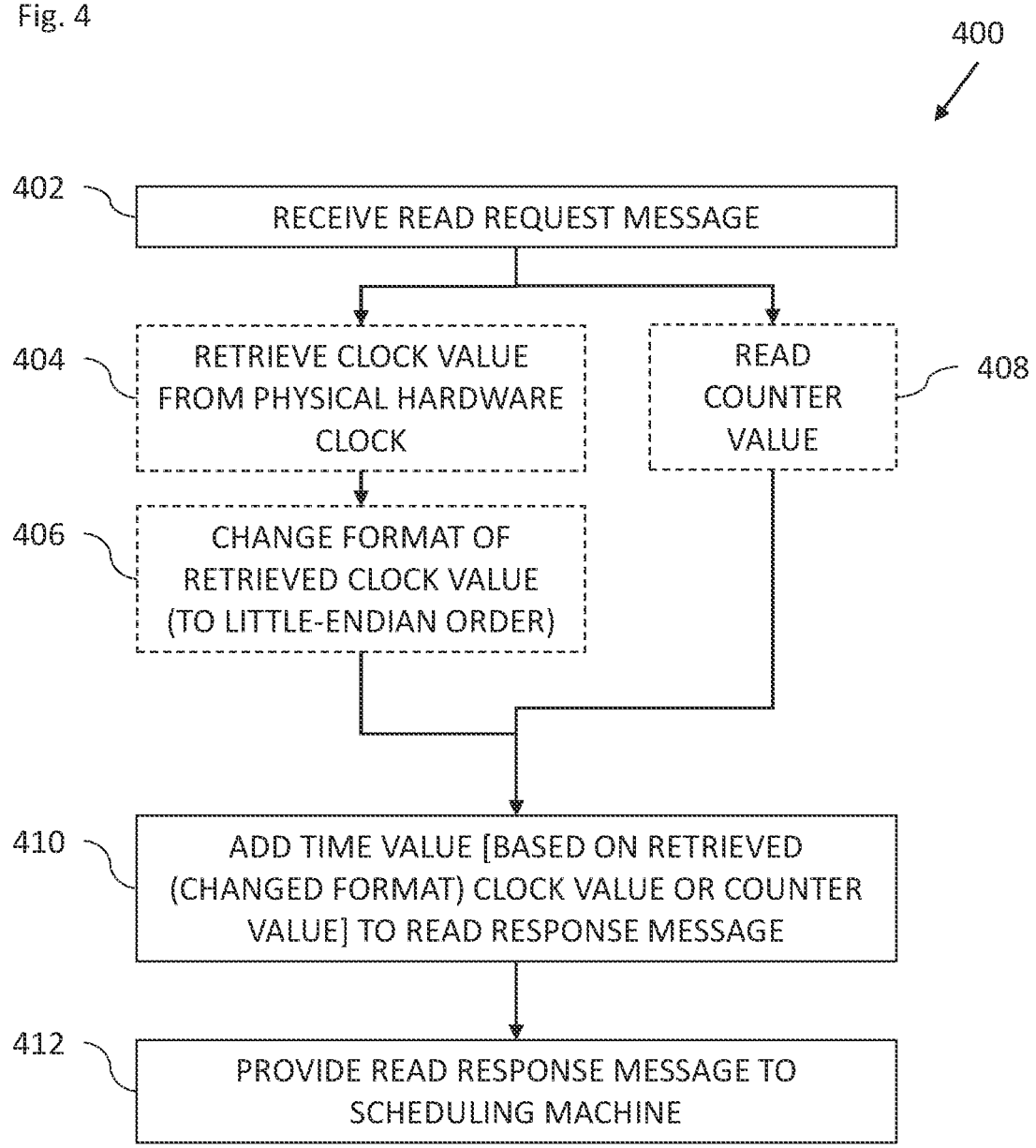
FIG. 4 is a flowchart including steps performed by a network interface controller in the system of FIG. 1.

Reference is now made to FIG. 4 is a flowchart 400 including steps performed by the network interface controller 18 in the system 10 of FIG. 1. Reference is also made to FIG. 1.

The bus interface 40 of the network interface controller 18 is configured to receive the read request message from the scheduling machine 14 (block 402). Responsively to the receiving the read request message from the scheduling machine 14 (and in some embodiments, responsively to the address of the read request message being in the address range of the initialization segment of the network interface controller 18), the processing circuitry 42 is configured to perform one or more of the steps of blocks 404-412.

In some embodiments, the processing circuitry 42 of the network interface controller 18 is configured to retrieve the clock value from the physical hardware clock 44 (block 404). In some embodiments, the processing circuitry 42 of the network interface controller 18 is configured to change the format of the retrieved clock value to a format used by the scheduling machine 14 (block 406). For example, a NIC natively operates in Big Endian whereas a GPU (which may comprise the scheduling machine 14) operates in little Endian. Therefore, in some embodiments, the processing circuitry 42 of the network interface controller 18 is configured to convert the format of the retrieved clock value from Big Endian order to Little Endian order. In some cases, the conversion between Big Endian to Little Endian may be performed by the scheduling machine 14 instead of by the network interface controller 18.

In some embodiments, the processing circuitry 42 of the network interface controller 18 is configured to retrieve the clock value intermittently and update a counter value responsively to the retrieved clock values. The counter may be incremented at any suitable time interval, for example, every 500 microsecs. Some processing in 5G networks has to be performed periodically, e.g., every 500 microsecs (e.g., a 5G slot or 5G symbol counter). In some embodiments, the processing circuitry 42 of the network interface controller 18 is configured to read the counter value responsively to receiving the read request message (block 408).

The processing circuitry 42 of the network interface controller 18 is configured to add a time value to a read response message (block 410). The time value may be equal to the retrieved clock value, and/or based on the retrieved clock value (e.g., the changed format retrieved clock value), and/or based on, or equal to the read counter value. The processing circuitry 42 of the network interface controller 18 is configured to send the read response message to the scheduling machine 14 via the bus interface 40 and peripheral data connection bus 20 (block 412).

Reference is again made to FIG. 3. Reference is also made to FIG. 1.

The bus interface 28 of the scheduling machine 14 is configured to receive the read response message including a time value from the network interface controller 18 (block 306). The processor 30 of the scheduling machine 14 is configured to read the time value from the received read response message (block 308). In some embodiments, the processor 30 of the scheduling machine 14 is configured to change a format of the time value (e.g., from Big Endian order to Little Endian order) (block 310).

The processor 30 is configured to schedule processing of one or more operations by the graphics processing unit 16 responsively to the read time value (or the changed format time value changed in the step of block 310) (block 312). The steps of block 304-312 may include the processor 30 being configured to: intermittently send read request messages to the network interface controller 18 and compare time values received from the network interface controller 18 in respective read response messages to a given time value (e.g., compare time T1 in message M1 to the given time value, and compare time T2 in message M2 to the given time value, and so on) responsively to the enqueued semaphore acquire 38; and schedule processing of the operation(s) by the graphics processing unit 16 after the semaphore acquire 38 completes processing responsively to the enqueued work request(s) 36.

The step of block 312 is now described in more detail.

The processor 30 is configured to compare the read time value or changed format time value to the given time value (block 314). The comparison may determine if the read time value or changed format time value is equal to, greater than, or less than, the given time value. At a decision block 316, the processor 30 determines if the read time value or changed format time value satisfies the comparison condition with the given value. If the condition is not satisfied, the steps of blocks 304 to 316 are repeated. If the condition is satisfied, the processor 30 is configured in response to the work request(s) 36 to schedule processing of the operation(s) by the graphics processing unit 16 (block 318). It should be noted that as the work entries in the work queue 34 are processed on a first-in-first-out (FIFO) basis and the semaphore acquire 38 is prior to the work request(s) 36 in the work queue 34, the work request(s) 36 cannot be processed until the semaphore acquire 38 has completed execution.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system comprising:
a peripheral data connection bus configured to connect to a plurality of processing devices and transfer data between the plurality of processing devices;
a scheduling machine configured to connect to the peripheral data connection bus and send a read request message to a first processing device of the plurality of processing device;
the first processing device configured to provide a read response message to the scheduling machine responsive to receiving the read request message; and
a host device configured to connect to the peripheral data connection bus and enqueue at least one work request in a work queue to trigger the scheduling machine to schedule execution of an operation by a second processing device of the plurality of processing devices when a read time value included in the read response message received by the scheduling device satisfies a condition associated with a given time value, wherein the second processing device executes the operation.

2. The system according to claim 1, wherein the first processing device is a network interface controller.

3. The system according to claim 2, wherein the scheduling machine is comprised in the network interface controller.

4. The system according to claim 2, wherein the second processing device is a graphics processing unit.

5. The system according to claim 4, wherein the scheduling machine is comprised in the graphics processing unit.

6. The system according to claim 1, wherein:
the first processing device comprises a physical hardware clock to store a clock value;
the first processing device is configured to retrieve the clock value from the physical hardware clock; and
the read time value is based on the retrieved clock value.

7. The system according to claim 6, wherein the first processing device is configured to synchronize the physical hardware clock to a clock value of a clock leader.

8. The system according to claim 6, wherein a conversion of a clock format of the retrieved clock value to a new clock format occurs prior to providing the read response message to the scheduling machine.

9. The system according to claim 8, wherein the new format of the retrieved clock value is a little-endian order.

10. The system according to claim 6, wherein the scheduling of the execution of the operation by the second processing device is responsive to a format change of the clock value.

11. The system according to claim 6, wherein:
the scheduling machine is configured to send the read request message with an address in an address range of an initialization segment of the first processing device to the first processing device; and
responsive to receiving the read request message with the address being in the address range of the initialization segment, the first processing device is configured to:
retrieve the clock value from the physical hardware clock; and
provide the read response message to the scheduling machine, wherein the read response message includes the read time value, and wherein the read time value is based on the retrieved clock value.

12. The system according to claim 1, wherein:
the first processing device comprises a physical hardware clock to store a clock value;
the first processing device is configured to:
retrieve the clock value from the physical hardware clock, wherein the read time value included in the read response message is based on an updated counter value and the retrieved clock value.

13. The system according to claim 1, further comprising a host device to connect to the peripheral data connection bus, the host device comprising a central processing unit to execute a software application to enqueue a semaphore acquire to trigger the scheduling machine to intermittently send read request messages to the first processing device, wherein the triggering of the processing of the operation by the second processing device occurs after the semaphore acquire completes processing.

14. A device, comprising:
an interface to:
connect to a peripheral data connection bus;
send a read request message to a first processing device; and
receive a read response message from the first processing device; and a processor to trigger scheduling of execution of an operation by a second processing device when a read time value included in the read response message satisfies a condition associated with a given time value, wherein the trigger occurs in response to at least one work request being enqueued in a work queue.

15. The device according to claim 14, wherein the first processing device is a network interface controller.

16. The device according to claim 15, wherein the second processing device is a graphics processing unit.

17. The device according to claim 14, wherein the scheduling of the execution of the operation by the second processing device is responsive to a change in a format of the read time value.

18. The device according to claim 14, wherein the interface is configured to send the read request message with an address in an address range of an initialization segment of the first processing device.

19. The device according to claim 14, wherein the processor is configured to intermittently send read request messages to the first processing device,
wherein the trigger occurs after an enqueued semaphore acquire completes processing.

20. A method, comprising:
connecting to a peripheral data connection bus;
sending a read request message to a first processing device;
receiving a read response message from the first processing device; and
triggering scheduling of execution of an operation by a second processing device when a read time value included in the read response message satisfies a condition associated with a given time value, wherein the triggering occurs in response to at least one work request being enqueued in a work queue.

21. The method according to claim 20, further comprising:
storing a clock value; and
retrieving the clock value, wherein the read time value included in the read response message is based on the retrieved clock value.

22. The method according to claim 21, wherein a conversion of a clock format of the retrieved clock value to a new clock format occurs.

23. The method according to claim 22, wherein the new clock format of the retrieved clock value is a little-endian order.

24. The method according to claim 21, wherein the sending includes sending the read request message with an address in an address range of an initialization segment of the first processing device, the method comprising responsively to the address being in the address range of the initialization segment:
retrieving the clock value, wherein the read time value included in the read response message is based on the retrieved clock value; and
providing the read response message to the scheduling machine.

25. The method according to claim 20, further comprising:
storing a clock value; and
retrieving the clock value, wherein the read time value included in the read response message is based on an updated counter value and the retrieved clock value.

26. The method according to claim 20, further comprising enqueueing a semaphore acquire to trigger a scheduling machine to intermittently send read request messages to the first processing device,
wherein the trigger occurs after an enqueued semaphore acquire completes processing.

* * * * *